(12) United States Patent
Oyoshi

(10) Patent No.: US 11,483,437 B2
(45) Date of Patent: Oct. 25, 2022

(54) APPARATUS, METHOD FOR CONTROLLING THE APPARATUS, AND STORAGE MEDIUM FOR EXECUTING TRIM PROCESSING AND PERFORMING WEAR LEVELING ON AREA IN USE

(71) Applicant: CANON KABUSHIKI KAISHA, Tokyo (JP)

(72) Inventor: Kazuhiro Oyoshi, Chiba (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 26 days.

(21) Appl. No.: 17/119,489

(22) Filed: Dec. 11, 2020

(65) Prior Publication Data

US 2021/0195032 A1 Jun. 24, 2021

(30) Foreign Application Priority Data

Dec. 20, 2019 (JP) ............................ JP2019-230913

(51) Int. Cl.
*H04N 1/21* (2006.01)
*H04N 1/00* (2006.01)
*G06F 3/06* (2006.01)

(52) U.S. Cl.
CPC ......... *H04N 1/0009* (2013.01); *G06F 3/0604* (2013.01); *G06F 3/0652* (2013.01); *G06F 3/0655* (2013.01); *G06F 3/0679* (2013.01); *H04N 1/00037* (2013.01); *H04N 1/0049* (2013.01); *H04N 1/00074* (2013.01); *H04N 1/00384* (2013.01); *H04N 1/00408* (2013.01); *H04N 1/00411* (2013.01);

(Continued)

(58) Field of Classification Search
None
See application file for complete search history.

(56) References Cited

U.S. PATENT DOCUMENTS 7,610,437 B2 * 10/2009 Sinclair ................ G06F 3/0652
711/104
7,984,084 B2 * 7/2011 Sinclair ............... G06F 16/1847
707/818

(Continued)

FOREIGN PATENT DOCUMENTS

| EP | 3293626 A1 * | 3/2018 | ........... G06F 3/0605 |
|---|---|---|---|
| GB | 2490991 A * | 11/2012 | ......... G06F 12/0246 |
| JP | 2015141681 A | 8/2015 | |

*Primary Examiner* — Christopher D Birkhimer
(74) *Attorney, Agent, or Firm* — Canon U.S.A., Inc. IP Division

(57) ABSTRACT

During TRIM processing, an apparatus cannot read/write data from/to a semiconductor storage device, and thus cannot perform processing using the device. If the TRIM processing is executed irrespective of a user's intention, the user is to wait for completion of the TRIM processing before performing a desired function of the apparatus. The apparatus includes a nonvolatile storage unit having semiconductor areas, a control unit configured to count a value of at least one type of data, an execution unit configured to execute TRIM processing that notifies the storage unit of an unused area among the semiconductor areas and performs wear leveling on an area in use among the semiconductor areas, and a notification unit configured to provide a notification prompting the execution of the TRIM processing when the counted value of the data satisfies a condition for a threshold.

17 Claims, 7 Drawing Sheets

(52) U.S. Cl.
CPC ..... *H04N 1/00501* (2013.01); *H04N 1/00795* (2013.01); *H04N 1/00832* (2013.01); *H04N 1/2104* (2013.01); *H04N 2201/0094* (2013.01)

(56) References Cited

U.S. PATENT DOCUMENTS

| | | | | |
|---|---|---|---|---|
| 8,285,918 | B2* | 10/2012 | Maheshwari | G06F 12/0891 711/159 |
| 8,443,263 | B2* | 5/2013 | Selinger | G06F 11/1068 714/768 |
| 8,873,284 | B2* | 10/2014 | Sinclair | G06F 12/0246 365/185.11 |
| 9,223,693 | B2* | 12/2015 | Sinclair | G06F 12/0246 |
| 9,336,133 | B2* | 5/2016 | Sinclair | G06F 12/0246 |
| 9,348,746 | B2* | 5/2016 | Sinclair | G06F 12/0246 |
| 9,465,731 | B2* | 10/2016 | Sinclair | G06F 3/0688 |
| 9,665,296 | B2* | 5/2017 | Wu | G06F 9/445 |
| 9,710,198 | B2* | 7/2017 | Wu | G06F 3/0679 |
| 9,734,050 | B2* | 8/2017 | Sinclair | G06F 12/0253 |
| 9,734,911 | B2* | 8/2017 | Sinclair | G06F 3/0658 |
| 9,778,855 | B2* | 10/2017 | Sinclair | G06F 3/064 |
| 10,120,613 | B2* | 11/2018 | Sinclair | G06F 12/02 |
| 10,133,490 | B2* | 11/2018 | Sinclair | G06F 3/0655 |
| 10,430,279 | B1* | 10/2019 | Dittia | G06F 3/0656 |
| 10,983,715 | B2* | 4/2021 | Sharoni | G06Q 20/105 |
| 2007/0033325 | A1* | 2/2007 | Sinclair | G06F 3/0608 711/170 |
| 2008/0082596 | A1* | 4/2008 | Gorobets | G06F 12/0253 |
| 2008/0189477 | A1* | 8/2008 | Asano | G06F 12/0246 711/E12.008 |
| 2011/0145473 | A1* | 6/2011 | Maheshwari | G06F 12/0873 711/E12.008 |
| 2011/0161784 | A1* | 6/2011 | Selinger | G06F 11/1016 714/E11.002 |
| 2014/0325148 | A1* | 10/2014 | Choi | G06F 3/0659 711/114 |
| 2014/0365719 | A1* | 12/2014 | Kuzmin | G06F 12/0246 711/103 |
| 2015/0301936 | A1* | 10/2015 | Matsui | G06F 3/0652 711/103 |
| 2016/0246713 | A1* | 8/2016 | Choi | G06F 3/0608 |
| 2017/0123655 | A1* | 5/2017 | Sinclair | G06F 3/061 |
| 2017/0300410 | A1* | 10/2017 | Zhang | G06F 12/0246 |
| 2019/0205040 | A1* | 7/2019 | Gao | G06F 3/0679 |
| 2019/0205245 | A1* | 7/2019 | Gao | G06F 12/0246 |
| 2020/0089420 | A1* | 3/2020 | Sharoni | G06F 21/79 |

* cited by examiner

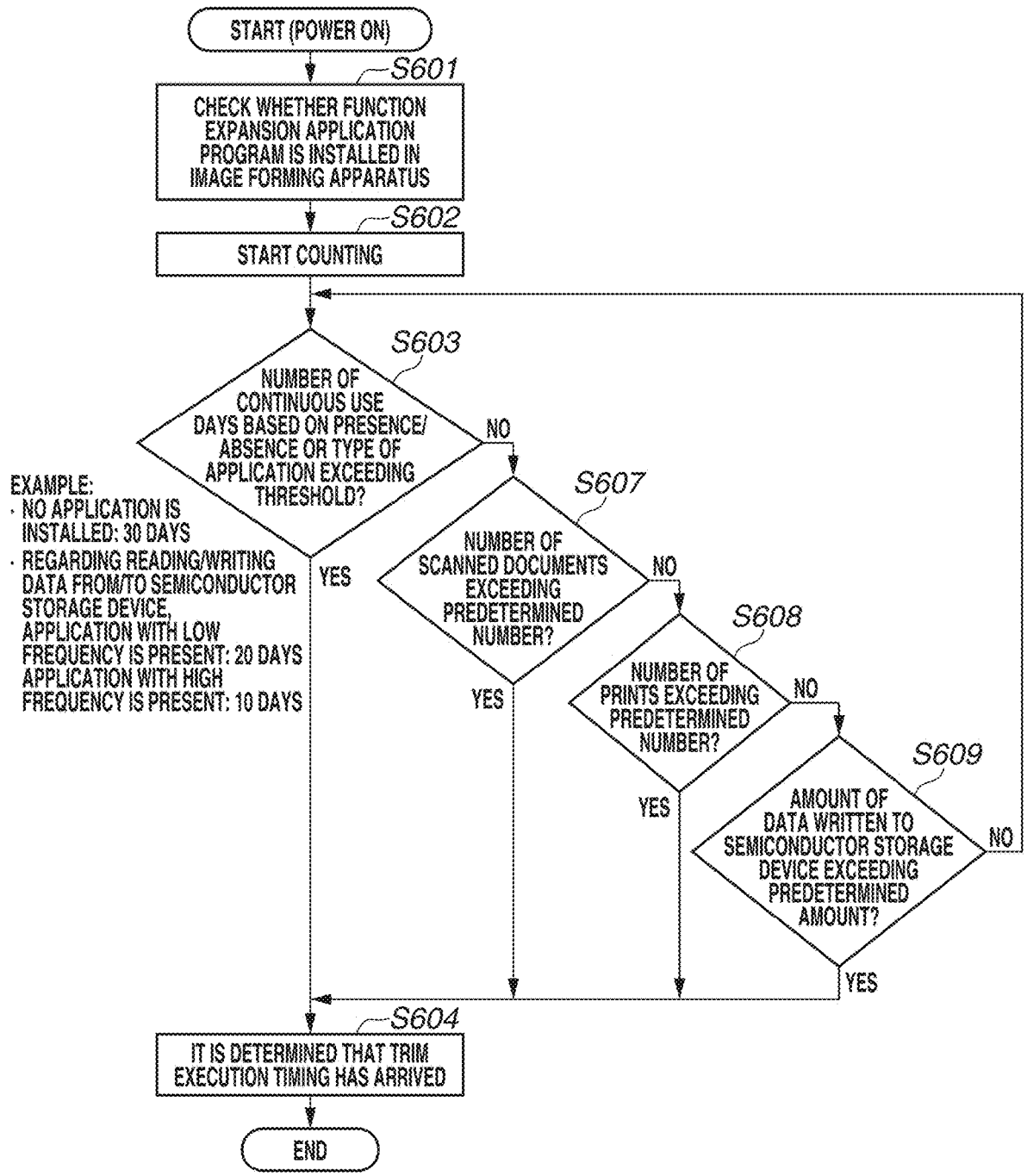

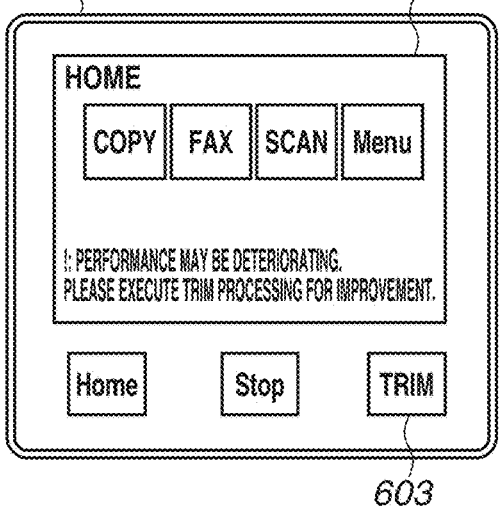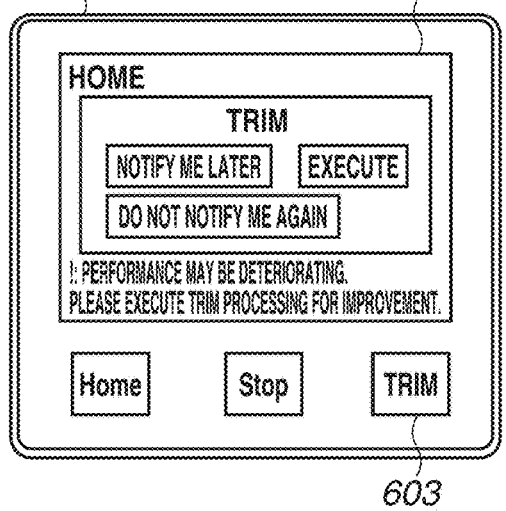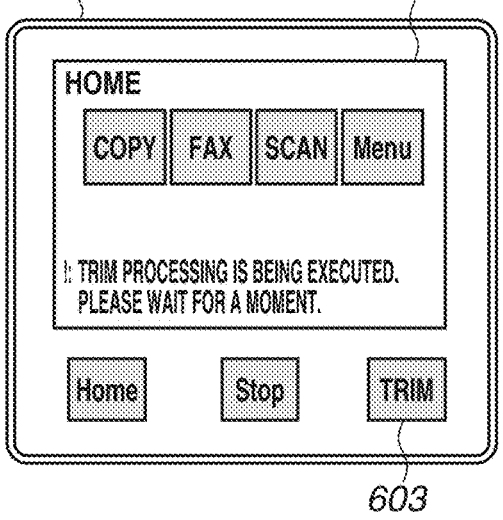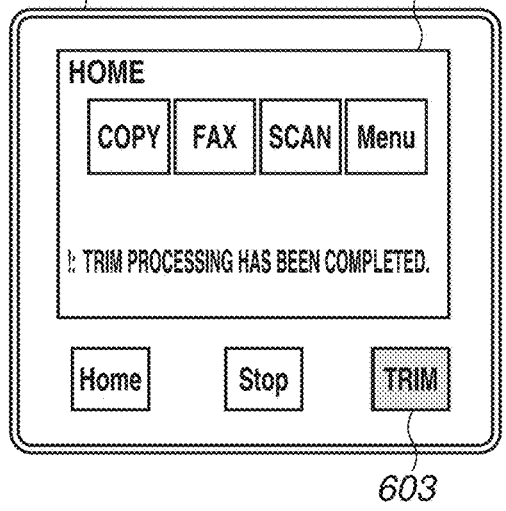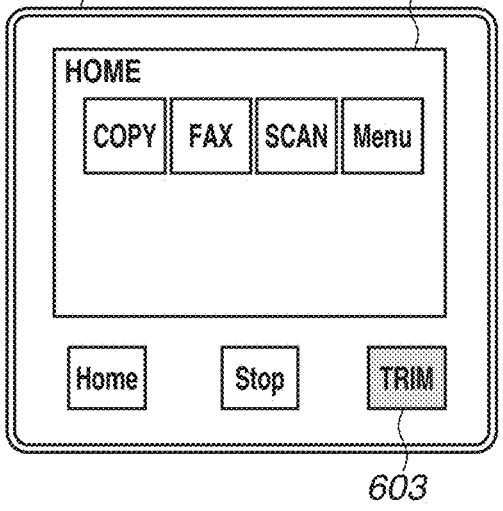

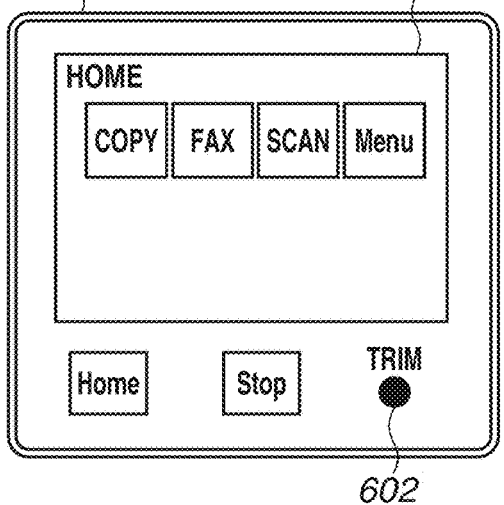
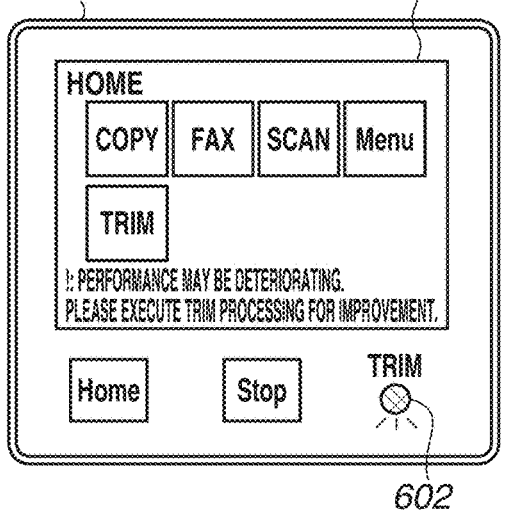
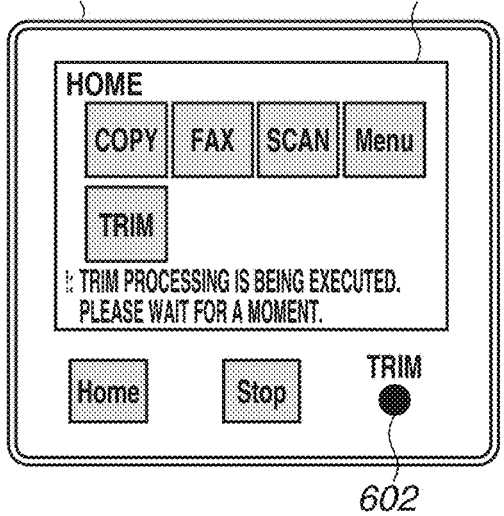
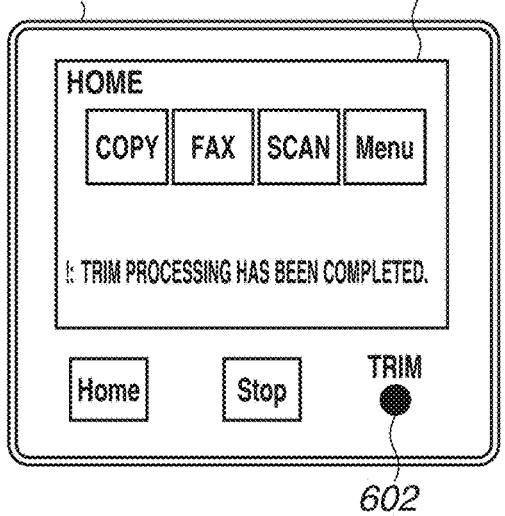
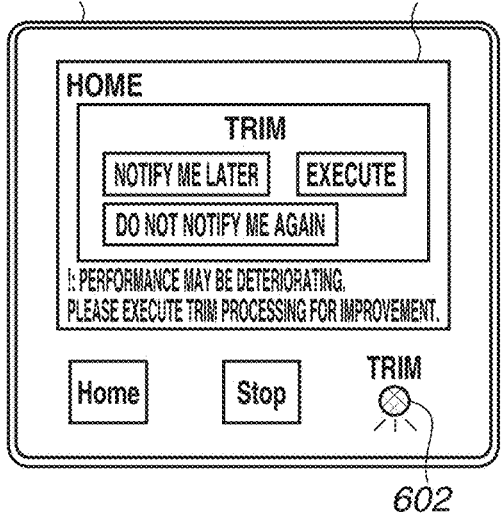

APPARATUS, METHOD FOR CONTROLLING THE APPARATUS, AND STORAGE MEDIUM FOR EXECUTING TRIM PROCESSING AND PERFORMING WEAR LEVELING ON AREA IN USE

BACKGROUND OF THE DISCLOSURE

Field of the Disclosure

The aspect of the embodiments relates to an apparatus, a method for controlling the apparatus, and a storage medium.

Description of the Related Art

There is a semiconductor storage device for embedded equipment, such as a solid state drive (SSD) or an embedded multimedia card (eMMC). Such a semiconductor storage device includes a flash memory and a control circuit, and is excellent in access speed and quietness as compared with a hard disk drive (HDD). However, the flash memory has a limited number of rewrites.

Thus, to prolong a service life of the flash memory built in the semiconductor storage device, a controller included in the semiconductor storage device performs distributed writing called wear leveling. In the wear leveling, writing is performed while blocks are replaced so as to use blocks that have been used fewer times for writing than other blocks. Accordingly, during execution of the wear leveling processing in an information processing apparatus, block erasing, data copying, and other operation are performed in replacing the blocks, which may lower performance (reading/writing performance) of the semiconductor storage device.

To avoid lower performance, a nonvolatile semiconductor storage device generally performs processing called TRIM. The TRIM is a command to notify the storage device of a storage area no longer needed by a file system of an operating system (OS).

More specifically, the TRIM command is used to notify the controller of the semiconductor storage device about an area no longer in use. The controller of the semiconductor storage device can recognize the unused area, thereby collecting areas in use to perform the wear leveling. This reduces the amount of data to be copied, the number of blocks to be used, and the total number of rewrites. Therefore, using the TRIM command to notify the semiconductor storage device of the storage area no longer needed can eliminate the need to perform the wear leveling processing on the unnecessary area, thereby preventing lowering in performance of the semiconductor storage device.

Regarding the execution timing of TRIM processing using the TRIM command, for example, Japanese Patent Application Laid-Open No. 2015-141681 discusses an image forming apparatus that acquires the status of a print job and when determining that the status indicates interruption of the job, automatically performs the TRIM command usable for the wear levelling.

SUMMARY OF THE DISCLOSURE

According to an aspect of the embodiments, an apparatus includes a nonvolatile storage unit having semiconductor areas, a control unit configured to count a value of at least one type of data, an execution unit configured to execute TRIM processing that notifies the storage unit of an unused area among the semiconductor areas and performs wear leveling on an area in use among the semiconductor areas, and a notification unit configured to provide a notification prompting the execution of the TRIM processing when the counted value of the data satisfies a condition for a threshold.

Further features of the disclosure will become apparent from the following description of exemplary embodiments with reference to the attached drawings.

BRIEF DESCRIPTION OF THE DRAWINGS

FIG. 5 is a flowchart illustrating a determination about the TRIM execution timing.

FIGS. 6A to 6E each illustrate an example of a display presented on a display unit of the image forming apparatus.

FIGS. 7F to 7J each illustrate an example of the display presented on the display unit of the image forming apparatus.

DESCRIPTION OF THE EMBODIMENTS

Exemplary embodiments of the disclosure will be described in detail with reference to the accompanying drawings. The following exemplary embodiments do not limit the disclosure according to the claims, and all of combinations of features described in the exemplary embodiments are not necessarily essential for solving means of the present disclosure.

Figure 1:
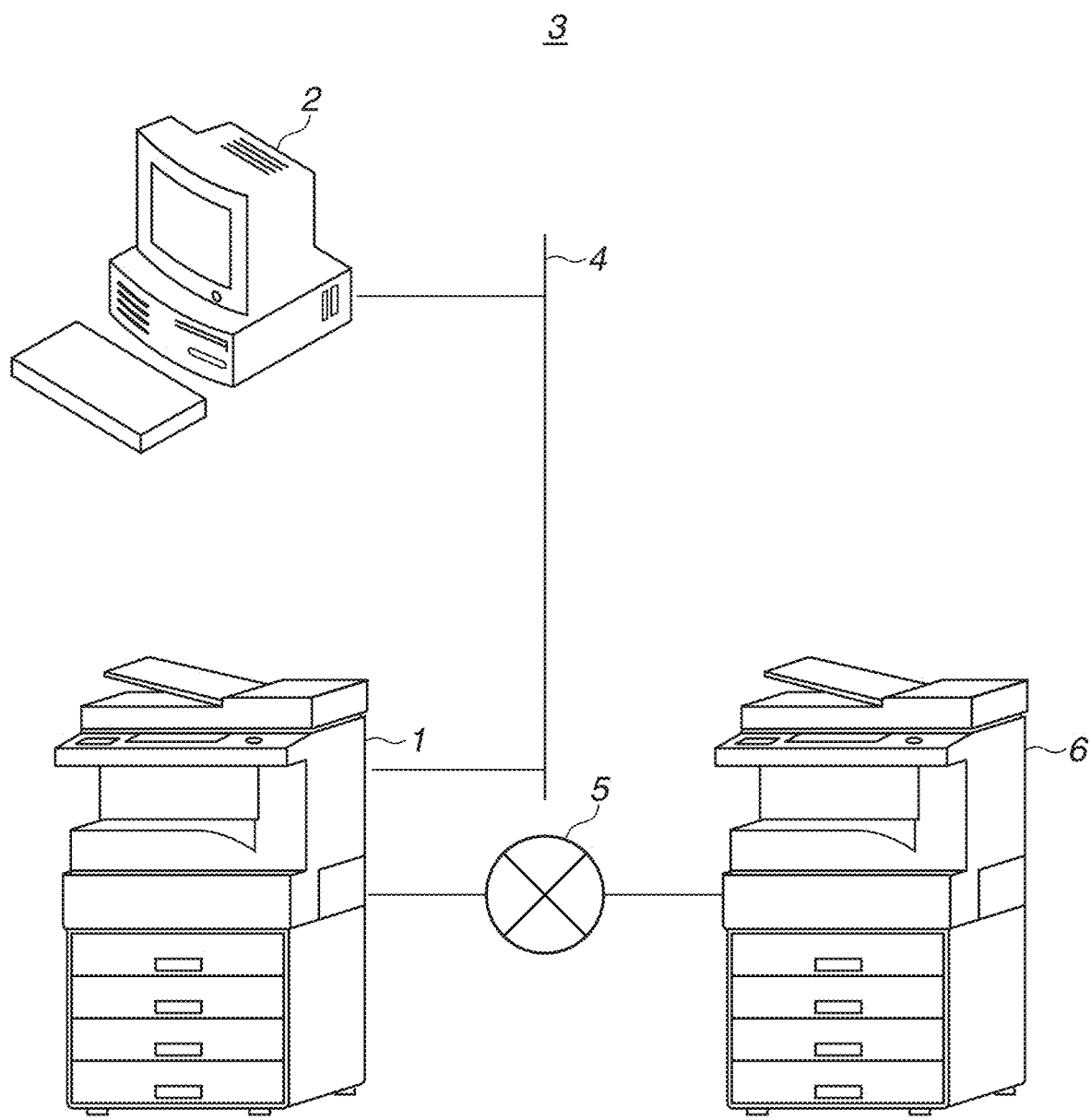
FIG. 1 is a block diagram illustrating an example of a configuration of an image forming system.

FIG. 1 is a block diagram illustrating an example of a configuration of an image forming system 3 according to a first exemplary embodiment. The image forming system 3 includes image forming apparatuses 1 and 6, an information processing apparatus 2, a network 4, and a public telephone network 5.

The image forming apparatus 1 and the information processing apparatus 2 are communicably connected to each other. In the present exemplary embodiment, the image forming apparatus 1 and the information processing apparatus 2 are connected through the network 4. Alternatively, the image forming apparatus 1 and the information processing apparatus 2 may be connected through a parallel cable, a serial cable, a universal serial bus (USB) cable, or the like. The image forming apparatus 1 and the image forming apparatus 6 are each connected to the public telephone network 5 through a telephone line.

The information processing apparatus 2 acquires setting information about each of functions of the image forming apparatus 1. Furthermore, the information processing apparatus 2 can generate page description language (PDL) data and print settings, and can transmit the generated PDL data and print settings as a print job to the image forming apparatus 1.

Each of the image forming apparatuses 1 and 6 is a multifunctional peripheral (MFP), a printer, or the like which includes a plurality of functions such as a copy function, a facsimile (FAX) function, a print function, and a scan function. Each of the image forming apparatuses 1 and 6 implements the copy function and the scan function by printing image data read by an automatic document feeder (ADF) 200 (refer to FIG. 2) or a reader unit 300 (refer to FIG. 2) on a recording medium, or transmitting the image data to the information processing apparatus 2.

The image forming apparatus 1 and the image forming apparatus 6 can implement the fax function by exchanging data such as image data therebetween through FAX communication. For example, the image forming apparatus 1 transmits the image data read by the ADF 200 or the reader unit 300 to the image forming apparatus 6, and the image forming apparatus 6 receives the image data and prints the image data on a recording medium. This can implement the FAX function.

In addition, the image forming apparatus 1 or the image forming apparatus 6 manages the PDL data and the print settings received from the information processing apparatus 2 as a print job, and executes the print job to implement the print function. While a configuration of the image forming apparatus 1 is described below, the configuration is applicable to the image forming apparatus 6. Each of the image forming apparatuses 1 and 6 is an example of an information processing apparatus.

Figure 2:
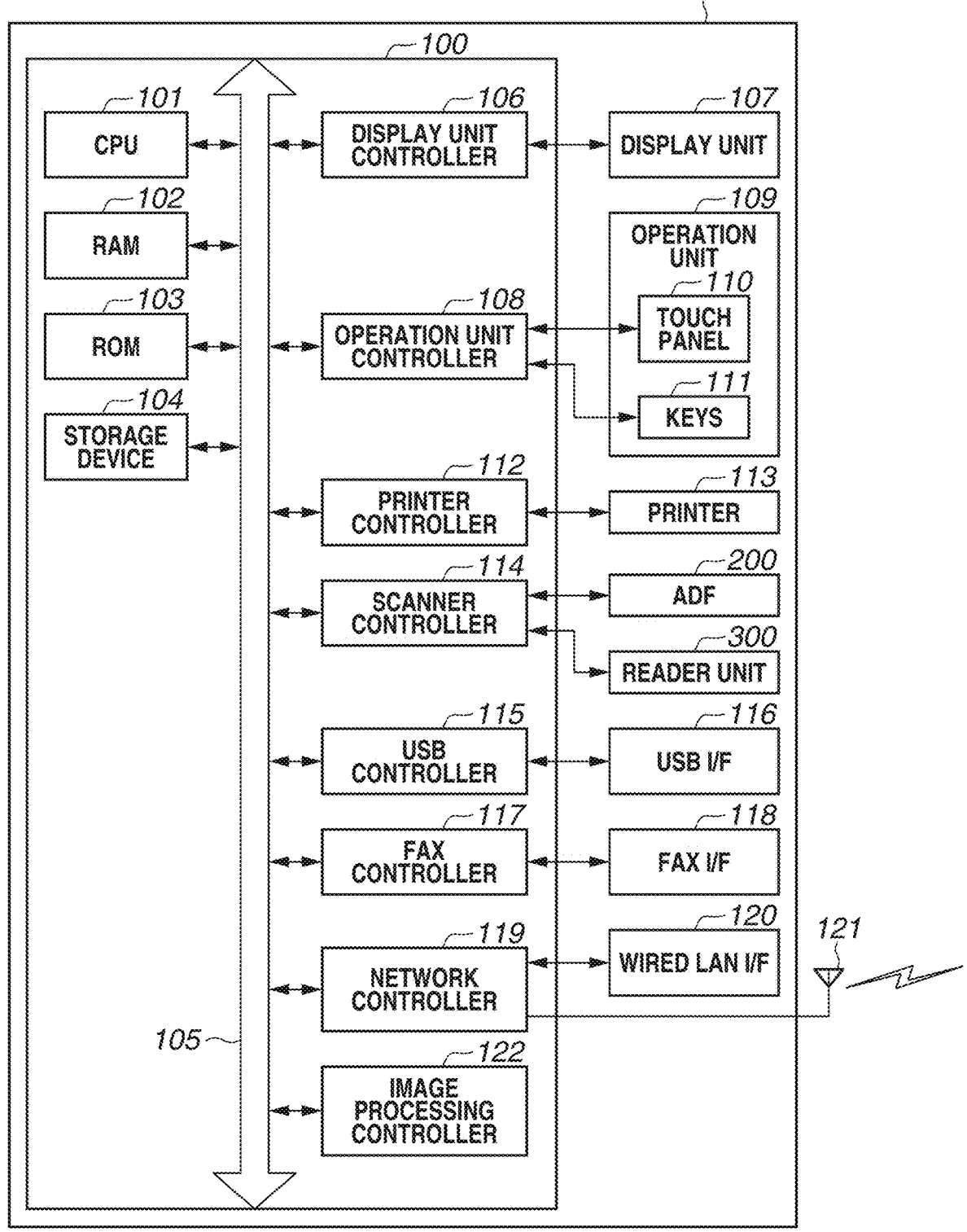
FIG. 2 is a block diagram illustrating a hardware configuration of an image forming apparatus.

FIG. 2 is a block diagram illustrating a hardware configuration of the image forming apparatus 1.

The image forming apparatus 1 includes a controller 100, a display unit 107, an operation unit 109, a printer 113, a USB interface (I/F) 116, a FAX I/F 118, a wired local area network (LAN) I/F 120, a wireless LAN antenna 121, the ADF 200, and the reader unit 300.

The controller 100 includes a central processing unit (CPU) 101, a random access memory (RAM) 102, a read only memory (ROM) 103, a storage device 104, a system bus 105, a display unit controller 106, an operation unit controller 108, a printer controller 112, and a scanner controller 114. The controller 100 further includes a USB controller 115, a FAX controller 117, a network controller 119, and an image processing controller 122. The operation unit 109 includes a touch panel 110 and keys 111.

The CPU 101 controls the entire image forming apparatus 1, and is connected to each of the units through the system bus 105. The RAM 102 is a work memory for operation of the CPU 101, and is used to load various kinds of programs, store a result of calculation processing, and store image data processed by the image processing controller 122 in operation such as printing and scanning. The ROM 103 stores an activation program of the CPU 101, various kinds of setting information, and the like.

The storage device 104 includes a semiconductor nonvolatile memory (flash memory) to store a large-size program and data in a semiconductor area. In the present exemplary embodiment, an embedded multimedia card (eMMC) is described as an example of the storage device 104. However, the storage device 104 is not limited to the eMMC, and may be, for example, a solid state drive (SSD) or any other semiconductor storage device.

The display unit controller 106 controls display information on the display unit 107. For example, the display unit controller 106 transmits image data to the display unit 107 according to a communication protocol of the display unit 107. The display unit 107 has a function of displaying drawing information received from the display unit controller 106 on a screen such as a liquid crystal display (LCD), and also includes a backlight that enables a user to visually recognize the content displayed on the screen.

The operation unit controller 108 receives an input from the touch panel 110 or the keys 111 included in the operation unit 109, and converts the input into data understandable by the CPU 101. The configuration of the operation unit 109 is not limited thereto. For example, the operation unit 109 may include the touch panel 110 (software keys) or the keys 111 (hardware keys).

The printer controller 112 controls various kinds of devices relating to a print operation of the printer 113, such as a photosensitive drum, a laser oscillator, and a toner fixer, in order to print image data designated by the CPU 101 on a sheet.

The scanner controller 114 controls loads on a sensor, a motor, and the like relating to a reading operation of the ADF 200 or the reader unit 300, and controls various kinds of devices such as a document detection sensor and a pressing plate opening/closing sensor.

Furthermore, the scanner controller 114 transfers document data acquired by reading a document, to the CPU 101 and the image processing controller 122, and notifies the CPU 101 of results acquired by the document detection sensor and the pressing plate opening/closing sensor.

The USB controller 115 performs communication of image data, etc. in a state where the USB I/F 116 and an external terminal are connected by a USB cable. The FAX controller 117 performs communication of image data, etc. in a state where the FAX I/F 118 and the public telephone network 5 are connected by a telephone line. The network controller 119 performs communication through the network 4 in a state where the wired LAN I/F 120 and an external terminal are connected by a LAN cable.

Furthermore, the network controller 119 performs wireless communication of image data, etc. with an external terminal through the wireless LAN antenna 121 and the network 4. The image processing controller 122 performs image processing, such as conversion of the document data received from the scanner controller 114 into image data, and enlargement, reduction, and monochromization for converting the document data into the image data to be printed by the printer 113.

Figure 3:
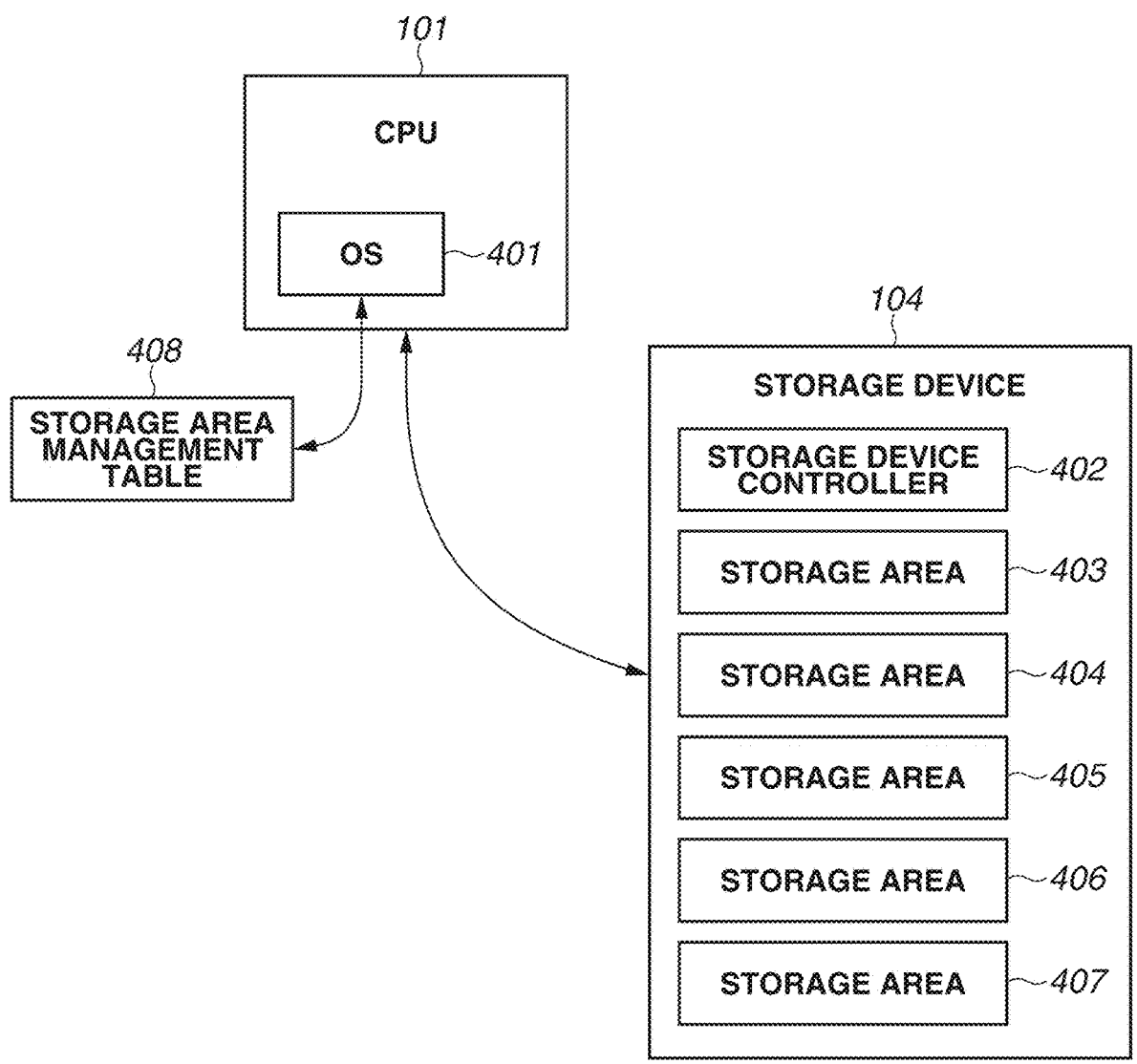
FIG. 3 is a block diagram illustrating processing performed by a central processing unit (CPU) and a storage device.

FIG. 3 is a block diagram illustrating processing performed by the CPU 101 and the storage device 104.

The controller 100 operates an operating system (OS) 401 by causing the CPU 101 to perform calculation. The OS 401 is basic software that controls and manages the entire software and hardware, and is shared by a large number of applications. The OS 401 includes a function of reading/writing data from/to the storage device 104.

For example, in a case where reading of data from the storage device 104 is performed in an application operating on the OS 401, the OS 401 issues a data reading command from the CPU 101 to the storage device 104. The storage device 104 that has received the data reading command operates a storage device controller 402 included therein, acquires data requested by the command from a storage area of the storage device 104, and transfers the data to the CPU 101. Likewise, in a case where data is written to the storage device 104, the OS 401 issues a data writing command from the CPU 101 to the storage device 104. The storage device 104 that has received the data writing command operates the storage device controller 402 included therein, and writes data requested by the command to the storage area of the storage device 104.

Furthermore, the OS 401 manages the storage area of the storage device 104 by dividing the storage area into a plurality of areas. More specifically, the OS 401 sets upper and lower limits for address values of the storage area of the storage device 104 accessible by each application so that the address value range for the application does not overlap with the address value range for any other application. The upper and lower limits of the address values may be defined by the head address of the storage area accessible by the application and the data amount from the head address. As a result, in a case where a plurality of applications writes data to the storage device 104, it is possible to prevent the plurality of applications from writing data to the same storage area, thereby preventing necessary data from being lost.

In addition, the OS 401 may hold, in a table, fixed values representing the above-described address value range accessible by each application. Alternatively, the OS 401 may hold variables representing the address value range, which are changed based on the operation rate of each application, in a file management system (not illustrated) held by the OS 401. In the present exemplary embodiment, it is assumed that the storage area is divided into five areas (storage areas 403 to 407). The OS 401 holds the fixed values of the upper and lower limits of the address value range of each of the storage areas 403 to 407 and a TRIM execution flag (described below) of each of the storage areas 403 to 407, in a storage area management table 408.

In writing of data to the storage device 104, the storage device controller 402 checks whether any data is present in an area designated by the data writing command before writing data in the area. The storage device controller 402 writes data to the designated storage area in a case where no data is present therein. The flash memory built in the storage device 104, however, has a limited number of rewrites for each data cell. Thus, to prolong a service life of the flash memory, the storage device controller 402 performs distributed writing called wear leveling.

In the wear leveling, writing is performed while blocks are replaced so as to use blocks that have been used fewer times for writing than other blocks. Accordingly, during the wear leveling processing by the storage device 104, block erasing, data copying, and other operation are performed in replacing the blocks, which may lower performance (reading/writing performance) of the storage device 104. To avoid lowering of the performance, processing called TRIM is generally performed.

The TRIM is the command to notify the storage device 104 of a storage block no longer needed by the file system of the OS 401. More specifically, the TRIM command is used to notify the storage device controller 402 of an area no longer in use. The storage device controller 402 can recognize the unused area, thereby collecting blocks in use to perform the wear leveling. In this example, processing in which the storage device 104 is notified of the area no longer used (needed) by the CPU 101 and then performs the wear leveling based on the notification is defined as TRIM processing. Execution of the TRIM processing can reduce the amount of data to be copied, the number of blocks to be used, and the total number of rewrites. Therefore, using the TRIM command to notify the storage device 104 of the storage block no longer needed can eliminate the need to perform the wear leveling processing on the unnecessary area, thereby preventing lowering in performance of the storage device 104.

However, while the above-described TRIM command is issued, the CPU 101 is occupied by notification of the storage area no longer needed, which interferes with operation of the other applications on the OS 401.

For example, in a case where the CPU 101 is controlling the printer controller 112 or the scanner controller 114 to perform a print job operation or a scan job operation, the CPU 101 may be occupied by the TRIM command, and may not be able to execute the job.

In addition, in a case where the CPU 101 is controlling the display unit controller 106 in response to an operation by a user, the occupation of the CPU 101 may stop operation of the display unit 107 such as screen transition. When the TRIM command is executed during the job operation or the operation by the user as described above, the user may misunderstand that a failure has occurred in the image forming apparatus 1. Thus, the TRIM command is issued during a period when no job is being executed or the user does not operate the image forming apparatus 1.

More specifically, in one embodiment, the TRIM command is issued after a predetermined time has elapsed since return of the image forming apparatus 1 to a standby mode after end of the job. The standby mode represents a state where initial setting of the hardware and the software in the image forming apparatus 1 is completed after power-on, or a state where the next job can be accepted from the user after end of the job.

The standby mode is a state where power supply and initial setting for operation of at least the CPU 101 and the storage device 104 are completed, and power supply to some or all of the blocks in the image forming apparatus 1 may be interrupted within a range not affecting the reception and execution of a job. For example, in a case where initial setting of the scanner controller 114 takes a long time, power supply to a part of the ADF 200 and the reader unit 300 not requiring initial setting may be interrupted while power is supplied to the scanner controller 114.

In addition, for example, while drawing of the display unit 107 is continued, the backlight may be turned off to reduce power consumption of the display unit 107 or may be turned on. The backlight of the display unit 107 may be controlled to be turned on or turned off during the TRIM processing. In a case where the display unit controller 106 controls a drawing signal using data recorded in the storage device 104, in one embodiment, the backlight is turned off to erase display of the display unit 107 because sufficient drawing performance may not be able to be obtained during the TRIM processing.

However, the drawing of the display unit 107 can be controlled without being affected by the TRIM processing, for example, in a case where the display unit controller 106 controls the drawing of the display unit 107 without using the data recorded in the storage device 104. Thus, the lighting control of the display unit 107 is not necessarily performed in conjunction with the TRIM processing. For example, when the display on the display unit 107 is to be erased in the TRIM processing, the display may be erased at the same time as when the TRIM processing starts, or the TRIM processing may start after the display is erased.

In addition, the operation modes of the image forming apparatus 1 include a sleep mode that consumes less power in the image forming apparatus 1 than the standby mode. The operation mode transitions to the sleep mode when sufficiently long time has elapsed after transition to the standby mode or when an operation instruction for transition to the sleep mode is received from the user. In the sleep mode, a part of operation of the CPU 101 as well as all or some of the modules including the display unit 107, the printer controller 112, the printer 113, the scanner controller 114, the ADF 200, and the reader unit 300 are stopped. Thus, the sleep mode can reduce more power consumption in the image forming apparatus 1 than the standby mode.

Thus, in the present exemplary embodiment, the TRIM processing is not executed in the sleep mode to minimize the operation of the CPU 101. In the sleep mode, execution of the TRIM processing is restricted for the purpose of preventing an increase in power consumption of the image forming apparatus 1. Thus, if influence of the power consumption for the TRIM processing is small, the TRIM processing may be executed in the sleep mode. In the present exemplary embodiment, it is important to execute the TRIM processing during the period not affecting the job operation or the user operation. Therefore, a condition for determining whether the TRIM processing can be executed in the standby mode and the sleep mode is not limited to power consumption.

Furthermore, even when the TRIM command is issued while the user does not perform operation, if all the areas of the storage device 104 are targeted by the TRIM processing, the occupation time of the CPU 101 becomes long. The time for the TRIM processing depends on the capacity of the storage device 104. For example, the TRIM processing for an embedded multimedia card (eMMC) having several gigabytes (GB) may take several ten seconds, and the TRIM processing for a solid state drive (SSD) may take more time. In this case, although the occupation time of the CPU 101 is long, a condition for issuing the TRIM command is limited to the period not affecting the user operation, which makes it difficult to issue the TRIM command. To avoid this, in one embodiment, the TRIM command is issued individually one by one to each of the storage areas 403 to 407. This reduces the time when the CPU 101 is occupied by one TRIM command, and the condition for issuing the TRIM command is eased.

The time to execute one TRIM command depends on data capacity per division of the storage area. Thus, finely dividing the storage area can reduce the occupation time of the CPU 101. In contrast, when the number of divisions of the storage area is increased, management of the storage area on the OS 401 is complicated and a processing time of the CPU 101 is increased. Therefore, dividing the storage area into excessively small areas is undesirable. In one embodiment, the storage area is divided so that the processing time of the CPU 101 for one TRIM command does not make the user feel uncomfortable, for example, so that the processing time is about seven seconds.

In addition, for example, to issue the TRIM command for each of the storage area 403 and the storage area 404 in the storage device 104, the CPU 101 first issues the TRIM command for the storage area 403, and issues the TRIM command for the storage area 404 after completion of the TRIM processing on the storage area 403.

Next, determination processing about notification of TRIM execution timing of the image forming apparatus 1 according to the present exemplary embodiment will be described in detail with reference to a flowchart in FIG. 4. A program for executing the processing of the flowchart in FIG. 4 is stored in the storage device 104, and is loaded into the RAM 102 and executed by the CPU 101.

The flowchart starts when the image forming apparatus 1 is turned on and transitions to the standby state.

First, in step S501, a subprocess to check the state of the image forming apparatus 1 and to check whether notification of the TRIM execution timing is necessary is performed.

Figure 4:
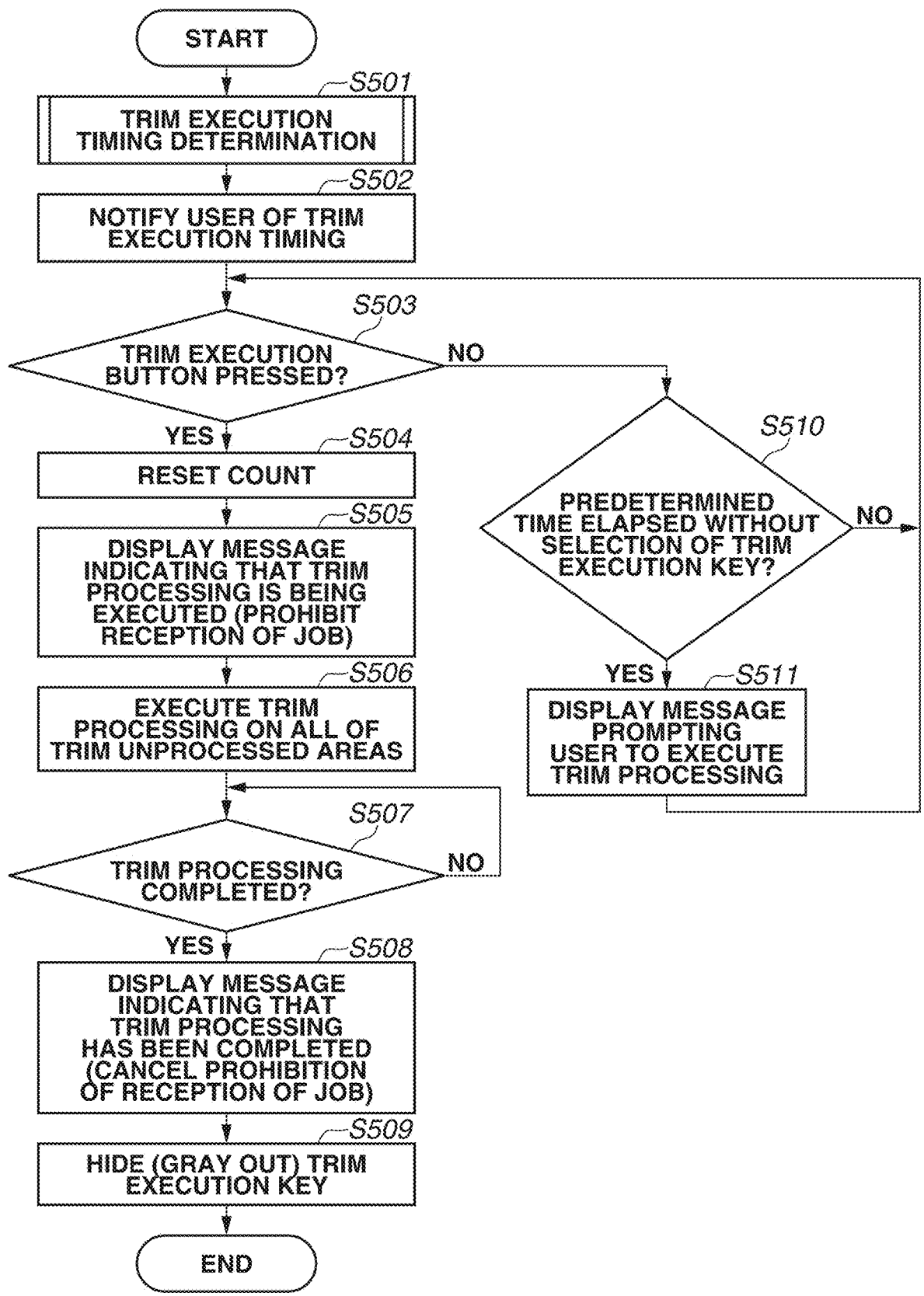
FIG. 4 is a flowchart illustrating an operation relating to a determination about notification of TRIM execution timing of the image forming apparatus.

FIG. 5 is an internal flowchart of the subprocess in step S501 in FIG. 4. A program for executing processing of the flowchart in FIG. 5 is stored in the storage device 104, and is loaded into the RAM 102 and is executed by the CPU 101.

In step S601, the CPU 101 checks whether an application program for extending the functionality of the image forming apparatus 1 has been installed. More specifically, the CPU 101 checks whether an application program has been stored in the storage device 104.

In addition, the CPU 101 sets a threshold enabling continuous use without the TRIM processing, based on the presence/absence or type of installed application program. For example, in a case where the functionality is not extended, the threshold is set to 30 days. In a case where the functionality is extended and data is read/written from/to the storage device 104 at low frequency, the threshold is set to 20 days. In a case where the functionality is extended and data is read/written from/to the storage device 104 at high frequency, the threshold is set to 10 days. Such setting may be changed by, for example, a service engineer or the user.

In step S602, the CPU 101 starts counting data corresponding to various conditions. More specifically, the CPU 101 counts the number of continuous use days (number of days when an application is in valid state) for the application checked in step S601. The valid state of the application indicates a state where the application is usable and accesses the storage device 104. An invalid state of the application indicates a state where the application is unusable and does not access the storage device 104.

Furthermore, to determine whether the timing is right to execute the TRIM processing, the CPU 101 counts the number of scanned documents and the number of prints. The number of scanned documents and the number of prints are counted separately for the TRIM processing because the number of scanned documents and the number of prints are used as criteria for determining whether to execute the TRIM processing. Furthermore, the CPU 101 counts the amount of data written to the storage device 104.

When the CPU 101 counts the amount of data written to the storage device 104, in order to calculate the actual amount of written data, in one embodiment, a data size is multiplied by a write amplification factor (WAF) and add the multiplied data size to the amount of written data. More specifically, a data size and a WAF value used to multiply the data size are stored in a table (not illustrated) in the storage device 104. Based on the data size requested to be written, the WAF to be used to multiply the data size is estimated. Then, the data size requested to be written is multiplied by the WAF, and the multiplied data size is accumulated (added) in the amount of written data. In this example, the configuration in which the amount of data written to the storage device 104 is counted has been described. Alternatively, the number of times of writing data may be simply counted.

The above-described count information is stored in the storage device 104, and the CPU 101 loads the count information into the RAM 102 and updates the count information. The CPU 101 stores the updated count information in the storage device 104. While in the present exemplary embodiment, an example in which four types of data are counted is described, the CPU 101 has to count at least one type of data.

After completion of the processing in step S602, the processing proceeds to step S603. In step S603, the CPU 101 determines whether the number of continuous use days based on the presence/absence or type of application has exceeded the number of days (threshold) set in step S601. In a case where the number of continuous use days has exceeded the set number of days (YES in step S603), the processing proceeds to step S604. The processing in step S604 will be described below. In a case where the number of continuous use days has not exceeded the set number of days (NO in step S603), the processing proceeds to step S607.

In step S607, the CPU 101 determines whether the number of documents scanned by the scanner function, among various functions of the image forming apparatus 1, has exceeded a predetermined number. In a case where the number of scanned documents has exceeded the predetermined number (YES in step S607), the processing proceeds to step S604. In a case where the number of scanned documents has not exceeded the predetermined number (NO in step S607), the processing proceeds to step S608.

In step S608, the CPU 101 determines whether the number of prints printed by the print function, among the various functions of the image forming apparatus 1, has exceeded a predetermined number (threshold). In a case where the number of prints has exceeded the predetermined number (YES in step S608), the processing proceeds to step S604. In a case where the number of prints has not exceeded the predetermined number (NO in step S608), the processing proceeds to step S609.

In step S609, the CPU 101 determines whether the amount of data written to the storage device 104 has exceeded a predetermined amount (threshold). In a case where the amount of data written to the storage device 104 has exceeded the predetermined amount (YES in step S609), the processing proceeds to step S604. In a case where the amount of data written to the storage device 104 has not exceeded the predetermined amount (NO in step S609), the processing returns to step S603. In a case where the number of writes is counted in step S602, the CPU 101 determines whether the number of writes has exceeded a predetermined number.

In step S604, the CPU 101 determines that the TRIM execution timing has arrived. The TRIM execution timing is a timing when it is predicted that execution of the TRIM processing can reduce a time necessary for reading/writing data from/to the storage device 104. While the data is counted up in the description of FIG. 5, the data may be counted down. In this case, the value is counted down from the set threshold, and when the value becomes zero, it is determined that the TRIM execution timing has arrived.

After completion of the processing in step S604, the processing returns to step S502 in FIG. 4. In step S502, the CPU 101 displays a notification of the TRIM execution timing on the display unit 107. FIG. 6A illustrates an example of the notification displayed at this time. FIG. 6A is an example of a display to notify the user that the TRIM execution timing has arrived. The display unit 107 includes a display LCD 601 on which various kinds of function buttons are displayed, and a TRIM execution key 603, and also displays a message prompting the user to execute the TRIM processing, using a banner. In this state, the user can perform an operation to issue the TRIM command, or the user can use the various kinds of functions as normal operation. The TRIM execution key 603 may be displayed on the display LCD 601.

In step S503, in a case where the user has not pressed the TRIM execution key 603 (NO in step S503), the processing proceeds to step S510. The processing in steps S503 and S510 is repeated until a predetermined time has elapsed without the TRIM execution key 603 being pressed by the user in step S510. In a case where the predetermined time has elapsed without the TRIM execution key 603 being pressed by the user (YES in step S510), the processing proceeds to step S511. In step S511, the CPU 101 displays the message prompting the user to execute the TRIM processing on the display unit 107. FIG. 6B illustrates an example of the message displayed at this time.

FIG. 6B is an example of a display to prompt the user to execute the TRIM processing after the predetermined time has elapsed since start of the TRIM timing notification. The display enables the user to select one of the following options: an option to execute the TRIM processing, an option to notify the user later because the user is willing to execute the TRIM processing, and an option not to notify the user again because the user is unwilling to execute the TRIM processing even later. In a case where the TRIM execution key 603 is displayed on the display LCD 601, the TRIM execution key 603, the option to notify the user later, and the option not to notify the user again are selectively displayed.

In this state, in one embodiment, the various kinds of functions cannot be used unless the user selects one of the options. In a case where a predetermined period has elapsed without any of the options being selected, the message prompting the user to execute the TRIM processing may be erased, and the displayed screen may be returned to the screen in FIG. 6A.

Referring back to step S503, in a case where the user presses the TRIM execution key 603 on the display of FIG. 6A displayed in step S502 (YES in step S503), the processing proceeds to step S504. In step S504, the count is reset. At this time, the number of counted days and the number of scanned documents counted for the TRIM processing are reset. Furthermore, the number of prints counted for the TRIM processing, and the counted amount of data written to the storage device 104 (or counted number of times of writing data to the storage device 104) are reset.

After completion of the processing in step S504, the processing proceeds to step S505. In step S505, the CPU 101 displays, on the display unit 107, a message indicating that the TRIM processing is being executed, and prohibits the reception of a job. FIG. 6C illustrates an example of the message displayed at this time. FIG. 6C is an example of a display to notify the user that the TRIM processing is being executed. The various kinds of function buttons and the TRIM execution key 603 are hidden, and the message indicating that the TRIM processing is being executed is displayed. In this state, the user cannot use the various kinds of functions. In this example, the various kinds of function buttons and the TRIM execution key 603 are hidden. Alternatively, a configuration may be used in which the various kinds of function buttons and the TRIM execution key 603 are in an unselected state or the function cannot be performed even when any of the buttons is selected.

After completion of the processing in step S505, the processing proceeds to step S506. In step S506, the CPU 101 issues the TRIM command to all the TRIM unprocessed areas of the storage device 104, and starts the TRIM processing. In step S507, the CPU 101 waits for completion of the TRIM processing. After completion of the TRIM processing, the processing proceeds to step S508.

At this time, for example, in a case where TRIM execution flags of all the storage areas 403 to 407 recorded in the storage area management table 408 are "low" (unexecuted), the TRIM processing is executed on all the storage areas 403 to 407. The TRIM processing is completed when all the TRIM execution flags become "high" (execution of the TRIM processing is unnecessary). Alternatively, for example, a predetermined storage area may be selected from among the storage areas 403 to 407 and the TRIM processing may be executed on the selected storage area so that the TRIM execution time is within a preset time limit.

In step S508, the CPU 101 displays, on the display unit 107, a message indicating completion of the TRIM processing, and cancels the prohibition of receiving a job. In step S509, the CPU 101 hides (grays out) the TRIM execution key 603 on the display unit 107. FIG. 6D illustrates an example of the message displayed at this time. FIG. 6D is an example of a display to notify the user of the completion of the TRIM processing. The various kinds of function buttons are displayed and the TRIM execution key 603 is hidden. Furthermore, the message indicating the completion of the TRIM processing is displayed using a banner. In this state, the TRIM command cannot be issued by the user operation, and the screen is displayed so that the user can use the various kinds of functions as normal operation. The message indicating the completion of the TRIM processing is erased after a predetermined period has elapsed since display of the message, and the displayed screen is changed to a screen in FIG. 6E.

FIG. 6E illustrates an example of a display presented when the execution of the TRIM processing is unnecessary, for example, after the TRIM processing is completed. The various kinds of function buttons are displayed and the TRIM execution key 603 is hidden. In this state, the TRIM command cannot be issued by the user operation, and the screen is displayed so that the user can use the various kinds of functions as normal operation.

With such a configuration, the user can execute the TRIM processing at a timing intended by the user, and does not need to wait for completion of the TRIM processing before performing a desired function of the information processing apparatus 2. This makes it possible to improve both operability of the user and performance of the information processing apparatus 2.

Next, modification examples of the displays illustrated in FIGS. 6A to 6E according to the present exemplary embodiment will be described with reference to FIGS. 7F to 7J. The configurations of FIGS. 1 to 5 in the modification examples are similar to those in the first exemplary embodiment. Therefore, the description thereof will be omitted.

FIG. 7F corresponds to FIG. 6E. FIG. 7F illustrates an example of a display presented when the execution of the TRIM processing is unnecessary, for example, after the TRIM processing is completed. The various kinds of function buttons are displayed and a TRIM notification light-emitting diode (LED) 602 is turned off. In this state, the TRIM command cannot be issued by the user operation, and the screen is displayed so that the user can use the various kinds of functions as normal operation.

FIG. 7G corresponds to FIG. 6A. FIG. 7G illustrates an example of a display to notify the user that the TRIM execution timing has arrived. The LED 602 emits light, and a TRIM execution button is displayed on the display LCD 601 in addition to the various kinds of function buttons. Furthermore, the message prompting the user to execute the TRIM processing is displayed using a banner. In this state, the user can perform an operation to issue the TRIM command, or the user can use the various kinds of functions as normal operation.

FIG. 7H corresponds to FIG. 6C. FIG. 7H illustrates an example of a display to notify the user that the TRIM processing is being executed. The LED 602 emits light, the various kinds of function buttons and the TRIM execution button are hidden on the display LCD 601, and the message indicating that the TRIM processing is being executed is displayed. In this state, the user cannot use the various kinds of functions.

FIG. 7I corresponds to FIG. 6D. FIG. 7I illustrates an example of a display to notify the user of the completion of the TRIM processing. On the display LCD 601, the various kinds of function buttons are displayed, the message indicating the completion of the TRIM processing is displayed using a banner, and the TRIM execution button is hidden. In this state, the TRIM command cannot be issued by the user operation, and the screen is displayed so that the user can use the various kinds of functions as normal operation. The message indicating the completion of the TRIM processing is erased after the predetermined period has elapsed since display of the message, and the displayed screen is returned to the screen in FIG. 7F.

FIG. 7J corresponds to FIG. 6B. FIG. 7J illustrates an example of a display to prompt the user to execute the TRIM processing after the predetermined time has elapsed since start of the TRIM timing notification. The display enables the user to select one of the following options: the option to execute the TRIM processing, the option to notify the user later because the user is willing to execute the TRIM processing, or the option not to notify the user again because the user is unwilling to execute the TRIM processing even later. In this state, the user cannot use the various kinds of functions unless the user selects one of the options. In a case where a predetermined period has elapsed without any of the options being selected, the message prompting the user to execute the TRIM processing is erased, and the displayed screen is returned to the screen in FIG. 7G.

While various exemplary embodiments of the disclosure have been described above, the spirit and the scope of the disclosure are not limited to the specific description in the present specification.

The exemplary embodiments of the disclosure can be implemented by supplying a program for implementing one or more functions of the above-described exemplary embodiments to a system or an apparatus through a network or a storage medium, and causing one or more processors in a computer of the system or the apparatus to read out and execute the program. Furthermore, the exemplary embodiments of the disclosure can be implemented by a circuit (e.g., application specific integrated circuit (ASIC)) for implementing one or more functions of the above-described exemplary embodiments.

OTHER EMBODIMENTS

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2019-230913, filed Dec. 20, 2019, which is hereby incorporated by reference herein in its entirety.

What is claimed is:

1. An apparatus comprising:
a nonvolatile storage having semiconductor areas;
controller configured to execute TRIM processing that notifies the nonvolatile storage of an area in use among the semiconductor areas and performs wear leveling on an area in use, wherein the controller counts a number of days through which an application is continuously active; and
a display configured to provide a notification prompting the execution of the TRIM processing to the nonvolatile storage when the number of the days counted by the controller satisfies a condition for a threshold.

2. The apparatus according to claim 1, wherein the controller counts an amount of data written to the nonvolatile storage,
wherein the controller causes the display to provide the notification prompting the execution of the TRIM processing by the controller to the nonvolatile storage when the amount of data written satisfies a condition for a first threshold.

3. The apparatus according to claim 1, further comprising a printer unit configured to print image data on a medium,
wherein the controller counts a number of media subjected to printing by the printer.

4. The apparatus according to claim 3, wherein the controller causes the display to provide the notification prompting the execution of the TRIM processing by the controller to the nonvolatile storage when the number of the media satisfies a condition for a second threshold.

5. The apparatus according to claim 1, further comprising a reader configured to read an image,
wherein the controller counts a number of documents read by the reader.

6. The apparatus according to claim 5, wherein the controller causes the display to provides the notification prompting the execution of the TRIM processing by the controller to the nonvolatile storage when the number of read documents satisfies a condition for a third threshold.

7. The apparatus according to claim 1, wherein the controller checks a type of the application stored in the nonvolatile storage, and
wherein the controller counts, the number of days thru which the checked application is continuously active.

8. The apparatus according to claim 7, wherein the controller sets a fourth threshold based on the type of the checked application,
wherein the controller causes the display to provide the notification prompting the execution of the TRIM processing by the controller when the number of days through which the application is in continuously active satisfies a condition for the fourth threshold.

9. The apparatus according to claim 1,
wherein the display displays a message prompting a user to execute the TRIM processing, as the notification prompting the execution of the TRIM processing.

10. The apparatus according to claim 9,
wherein the display is a touch panel, and
wherein the display displays a selectable software key that enables the user to give an instruction to execute the TRIM processing, as the notification prompting the execution of the TRIM processing.

11. The apparatus according to claim 9, further comprising a hardware key configured to enable the user to give an instruction to execute the TRIM processing,
wherein the TRIM processing is started when the display displays the message prompting the user to execute the TRIM processing and the user presses the hardware key.

12. The apparatus according to claim 10, wherein the TRIM processing is started when the display displays the message prompting the user to execute the TRIM processing and the user selects the software key.

13. The apparatus according to claim 10, wherein, in a case where the counted value of the data does not satisfy the condition for the threshold, the display makes the software key unselectable.

14. The apparatus according to claim 1, wherein the satisfaction of the condition for the threshold indicates exceeding of the threshold.

15. The apparatus according to claim 1, wherein the nonvolatile storage is an embedded multimedia card (eMMC).

16. A method for controlling an apparatus comprising a nonvolatile storage having semiconductor areas, and a controller configured to execute TRIM processing that notifies the nonvolatile storage of an area in use among the semiconductor areas and performs wear leveling on an area in use, wherein the controller counts a number of days through which an application is continuously active, the method comprising:
providing a notification prompting the execution of the TRIM processing to the nonvolatile storage when the number of the days counted by the controller satisfies a condition for a threshold.

17. A non-transitory computer readable storage medium storing a program for causing a computer to perform a method for controlling an apparatus comprising a nonvolatile storage having semiconductor areas, and a controller configured to execute TRIM processing that notifies the nonvolatile storage of an area in use among the semiconductor areas and performs wear leveling on an area in use, wherein the controller counts a number of days through which an application is continuously active, the method comprising:
providing a notification prompting the execution of the TRIM processing to the nonvolatile storage when the number of the days counted by the controller satisfies a condition for a threshold.

* * * * *